United States Patent
Miklosch et al.

(10) Patent No.: US 10,372,828 B2
(45) Date of Patent: Aug. 6, 2019

(54) ASSESSING TRANSLATION QUALITY

(71) Applicant: SAP SE, Walldorf (DE)

(72) Inventors: Yvonne Miklosch, Nussloch (DE); Ralph Debusmann, Ludwigsburg (DE); Michail Vasiltschenko, Schriesheim (DE); Thomas Alcantara Kliche, Wiesloch (DE); Abdallah El Sahhar, Alexandria (EG); Susanne Hempel, Vancouver (CA); Yu Zhang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/628,645

(22) Filed: Jun. 21, 2017

(65) Prior Publication Data

US 2018/0373706 A1 Dec. 27, 2018

(51) Int. Cl.
*G06F 17/28* (2006.01)

(52) U.S. Cl.
CPC ........ *G06F 17/2854* (2013.01); *G06F 17/289* (2013.01)

(58) Field of Classification Search
None
See application file for complete search history.

(56) References Cited

U.S. PATENT DOCUMENTS

| | | | | |
|---|---|---|---|---|
| 9,836,457 B2* | 12/2017 | Fujiwara | ............ | G06F 17/2854 |
| 2009/0106017 A1* | 4/2009 | D'Agostini | ......... | G06F 17/2836 |
| | | | | 704/3 |
| 2011/0218939 A1* | 9/2011 | Hanahara | ............ | G06F 17/2836 |
| | | | | 705/400 |
| 2012/0265518 A1* | 10/2012 | Lauder | ................ | G06F 17/2854 |
| | | | | 704/3 |
| 2012/0284015 A1* | 11/2012 | Drewes | ............... | G06F 17/2818 |
| | | | | 704/3 |
| 2014/0188453 A1* | 7/2014 | Marcu | ................. | G06F 17/2854 |
| | | | | 704/2 |
| 2014/0278341 A1* | 9/2014 | Ranjan | ................ | G06F 17/2854 |
| | | | | 704/2 |

(Continued)

OTHER PUBLICATIONS

Arle Lommel and Alan K. Melby; Multidimensional Quality Metrics (MQM) Issue types; Mar. 19, 2014; German Research Center for Artificial Intelligence, Saarbrücken, Germany; (http://www.qt21.eu/mqm-definition/issues-list-2014-03-19.html).

*Primary Examiner* — Neeraj Sharma
(74) *Attorney, Agent, or Firm* — Fish & Richardson P.C.

(57) ABSTRACT

Various embodiments of systems, computer program products, and methods to assess translation quality are described herein. In an aspect, a translated text is received during translation of content from a source language to a target language. The received translated text is detected as an incorrect translation by analyzing a number of quality checks in a translation quality algorithm. An error category corresponding to the incorrect translation is determined based on a root cause of the incorrect translation. Further, a counter is incremented in a corresponding error category. When the counter exceeds a threshold, an action to prevent submission of the translation is triggered based on a combined error score. The combined error score is a combined weighted error score from error categories which have exceeded their respective thresholds.

17 Claims, 5 Drawing Sheets

(56) References Cited

U.S. PATENT DOCUMENTS

| | | | | |
|---|---|---|---|---|
| 2015/0199340 A1* | 7/2015 | Kwon | .................. | G06F 17/289 |
| | | | | 704/2 |
| 2017/0046333 A1* | 2/2017 | Mirkin | .................. | G06F 17/289 |
| 2017/0075883 A1* | 3/2017 | Kamatani | ............ | G06F 17/2836 |
| 2017/0169015 A1* | 6/2017 | Huang | ................ | G06F 17/2854 |
| 2017/0185588 A1* | 6/2017 | Rottmann | ............ | G06F 17/2854 |
| 2018/0108053 A1* | 4/2018 | Simpkin | ............ | G06Q 30/0283 |

* cited by examiner

& # x 2 0 ; # ASSESSING TRANSLATION QUALITY

BACKGROUND

Obtaining a high-quality translation of content from a source language to a target language may be important to meet global market needs. Both machine-based translation systems and professional human translators may be needed to produce translations in different scenarios by understanding factors, such as syntax, semantics, and language ambiguity. However, the level of quality of translation by both machine and human translators may be hard to determine as it is a subjective matter. For example, a translation may be considered as good quality when persons with control of both the source content and the translated content find it to be accurate and succinct. Hence, translations are often of variable quality.

In existing methods to detect quality of translations, the quality is assessed too late in the translation process. For example, the quality is assessed during language acceptance testing, language validation post translation, or when the content is used by customers. Further, quality of the translation may be detected reviewing by a proofreader which may require significant human effort and can be expensive and inadequate.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to assess translation quality are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (receiving, determining, retrieving, incrementing, triggering, and so on) may be performed by a hardware device (e.g., computing system), even if the action may be authorized, initiated or triggered by a user, or even if the hardware device is controlled by a computer program, software, firmware, and the like.

Figure 1:
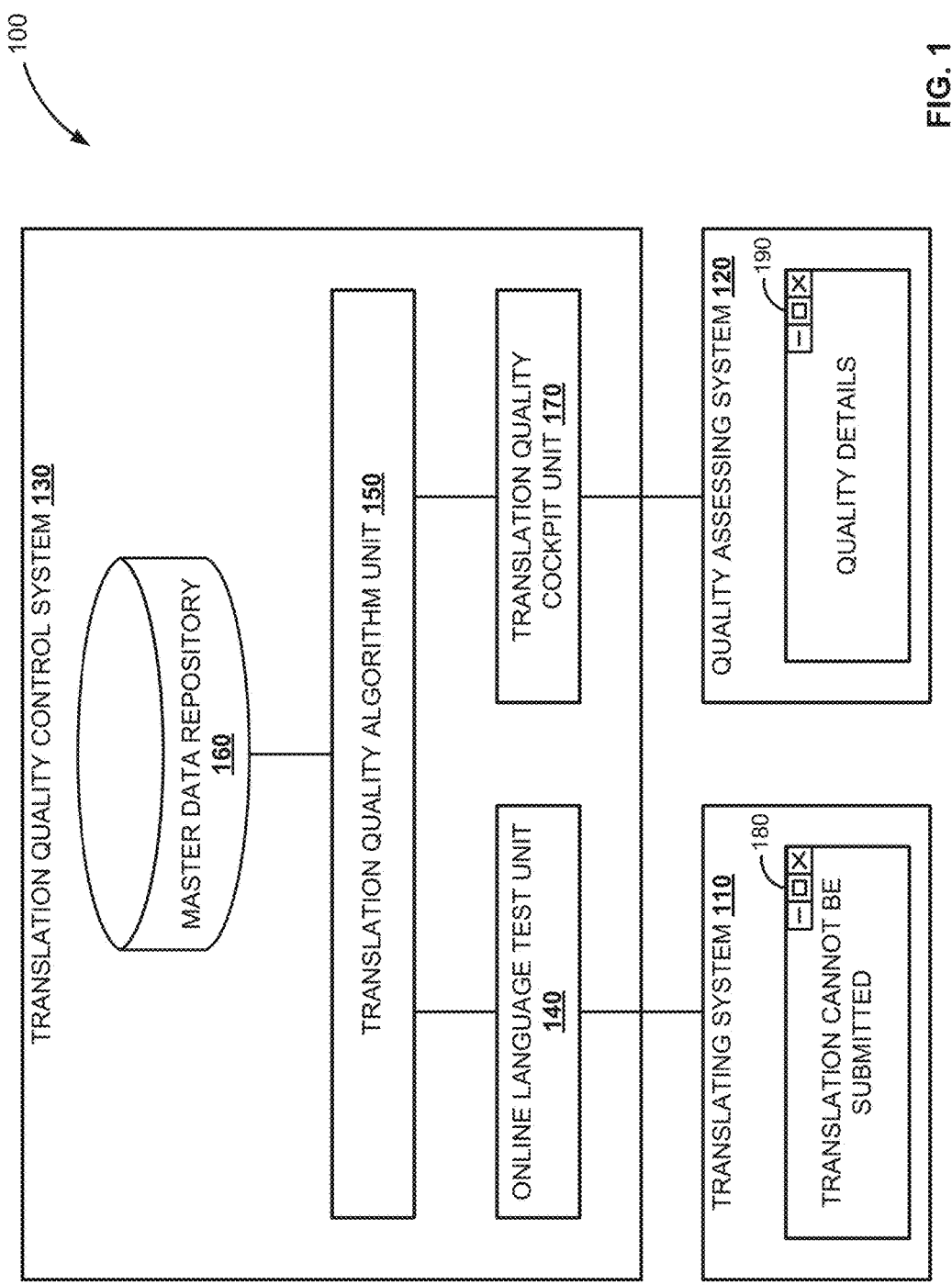
FIG. 1 is a block diagram illustrating a computing environment for assessing translation quality, according to one embodiment.

FIG. 1 is a block diagram illustrating computing environment 100 for assessing translation quality, according to one embodiment. The computing environment 100 may include one or more translating systems (e.g., translating system 110) associated with translators and quality assessing system 120 associated with a client. The client may refer to a user who has assigned translating work to the translators or suppliers. Examples of the translating system 110 and the quality assessing system 120 may include, but are not limited to a desktop computer, a laptop computer, a tablet computer, or a mobile phone.

The translating work may include translating content. The content may be, but not limited to digital content or a software. Further, the content may include text, images, audio, video or any combinations thereof. The creator (e.g., client) of the content may use a natural language (e.g., English, French, German, Chinese, Russian, Spanish, Polish or other natural language) to create the content. Users of different natural languages, however, may be unable to utilize the content unless the content is translated to their natural language. Hence, the client may entrust the translation work to the translator and the translator in turn provides translated content. The translated content may refer to text of any kind and form regardless of format, representation and encoding, of any terrestrial language that has been translated, transcribed, interpreted or otherwise converted from an original source language by human or machine learning methods to a target language.

In one embodiment, the computing environment 100 may include translation quality control system 130 to assess the quality of translations provided by the translating system 110 early in the translation process (e.g., during translation). As shown in FIG. 1, the translating system 110 is communicatively connected to the translation quality control system 130. For example, the translation quality control system 130 may reside in the translating system 110. In another example, the translation quality control system 130 may reside in a remote server, and the translating system 110 may be configured to access the translation quality control system 130.

In one embodiment, the translation quality control system 130 includes online language test unit 140 to assess the quality of the translation during the process of translation. For example, when a translated text is received during translation of the content from a source language to one or more target languages, the online language test unit 140 is activated. The online language test unit 140 may use translation quality algorithm unit 150 to determine whether the received translated text is a correct translation or an incorrect translation. The translation quality algorithm unit 150 may include a number of factors or quality checks (e.g., to check both technical and linguistic aspects) such as, but are not limited to "productivity" check, "terminology" check, "legacy texts" check, "text length" check, "re-use of existing translations" check, "deviation from translation memories or terminology databases" check, "translator quality history" check, "language change over time" check, and "clean-up of outdated terminology" check. The various quality checks are described in greater detail in FIG. 2. Further, data supporting the number of quality checks may be stored in master data repository 160. The master data repository 160 may include mock master data or sample test (e.g., re-usable) data such as, but not limited to material (e.g., translation related file) names and customer details used to simulate real-world data. For example, the master data repository 160 may be any kind of database and may reside in the translation quality control system 130 as shown in FIG. 1 or in the remote server.

In one embodiment, when the received translated text is determined as incorrect, root cause of an error is determined. The root cause defines reason for the incorrect translation. For example, the root cause may be, but not limited to "misspelling", "ambiguous source text", "unclear abbreviation", "lack of defined source terminology", "lack of instructions on translation", "lack of industry knowledge", and "wrong source language." Further, based on the root cause of the error, a corresponding error category may be identified. For example, when the root cause is "unclear abbreviation", the error category may be "mistranslation." Example root causes and corresponding error categories are described in FIG. 3.

In one embodiment, based on, the error category, a counter associated with the error category, and a combined error score, an action is triggered to prevent submission of the translation. For example, when the error category of the incorrect translation is determined to be "mistranslation" (e.g., general quality issue), the counter associated with "mistranslation" is incremented. Further, when the counter exceeds a threshold associated with the error category, the error category is considered for the combined error score. When the combined error score exceeds a predefined value or language quality tolerance, the action is triggered. The action can be, but not limited to, sending a notification to the translator mentioning the translation of the content cannot be submitted (e.g., as shown in 180). When the incorrect translation is due to missing knowledge about the domain or product or terminology, a message is sent to the translator for appropriate correction (e.g., to correct terminology of the content). When the incorrect translation is due to low quality source text, a message is sent to the client or development team, for example, setting affected text "on hold" for the translation.

The translation quality control system 130 automatically detects and categorizes quality issues, and triggers necessary actions automatically to prevent translators from continuing translation with low quality. Hence, the translation quality control system 130 is introduced to intervene as early as possible in the translation process to deliver high-quality translation in an environment which includes shorter release cycles. For example, detecting the translation quality early becomes increasingly important in cloud world as there is constant development and delivery in the cloud, where the time frame for the translations is shorter.

In one embodiment, the translation quality control system 130 may be used to assess the quality of automatically generated translations e.g., machine translation). In this regard, the quality assessing system 120 is communicatively connected to the translation quality control system 130. For example, the translation quality control system 130 may reside in the quality assessing system 120. In another example, the translation quality control system 130 may reside in the remote server, and the quality assessing system 120 may be configured to access the translation quality control system 130.

In one embodiment, the translation quality control system 130 includes translation quality cockpit unit 170 to provide a quality manager for the client with a user interface (e.g., translation quality cockpit user interface 190), which gives an overview of the current quality details and supports correction decisions with cost estimations. An example translation quality cockpit user interface is described in FIG. 4. Hence, the translation quality control system 130 assists the clients and the translators to find a compromise between speed and productivity with an acceptable quality of the translations.

Figure 2:
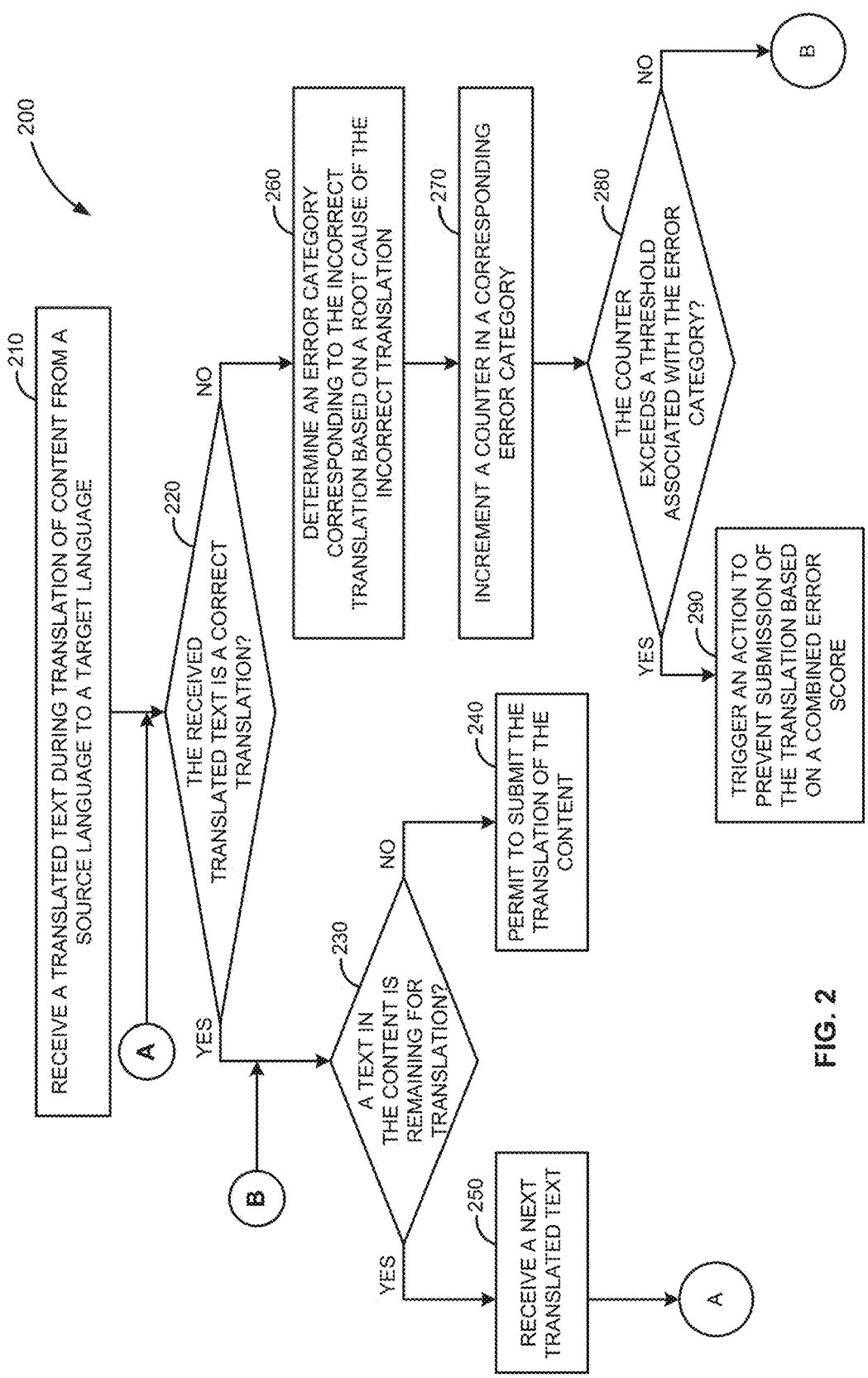
FIG. 2 is a flow diagram illustrating an example process to assess translation quality, according to an embodiment.

FIG. 2 is a flow diagram illustrating example process 200 to assess translation quality, according to an embodiment. At 210, a translated text is received during translation of content from a source language to a target language, at a translation quality control system. The content may include text, images, audio, video or any combinations thereof. In one embodiment, when a translator initiates to perform a task of translating the content, an online language test unit in a translation quality control system is activated.

At 220, a check is made to detect whether the received translation of the text is a correct translation or not by an online language test unit of the translation quality control system. In one embodiment, the online language test unit may use a translation quality algorithm unit and a master data repository to detect whether the received translation is an incorrect translation or not. The translation quality algorithm unit may include quality checks such as, but are not limited to "productivity" check, "terminology" check, "legacy texts" check, "text length" check, "re-use of existing translations" checks, "deviation from translation memories or terminology databases" checks, "translator quality history" check, "language change over time" check, and "clean-up of outdated terminology" check.

"Productivity" check defines a scenario of having a higher risk of producing low-quality translations when a translator translates too many texts or words in a short time. In terminology check, source texts are checked for terminology. For example, terminology correctness of the translated text is checked with a corresponding terminology database. "Legacy texts" check includes checking parts/texts of a product delivery which are reused from the other products or versions, for example. "Text length" check determines whether the low-quality translation is caused by a text length which is too small (e.g., abbreviations).

"Re-use" checks identify existing translations and avoid duplicates or variants. In "deviation from translation memories or terminology databases" check, a check is made to determine how far the translation deviates from the already existing translation when the text is already translated in the translation memory or terminology database (e.g., using the same terminology domain). When the translation deviates from already existing translation of the same source text (e.g., in a translation memory), it can well be false. For example, when a word in the context of a button text such as "Cancel" is translated as "Stomieren" in German, and in the translation memory, it is translated as "Abbrechen", the former translation probably is considered as low-quality. The terminology domain can be referred to as a subject area or a concept or a topic or a particular area. For example, the domain can be, but not limited to, an application domain (e.g. "finance" domain), a product (e.g. "SAP® Business ByDesign®"), a company activity (e.g. "marketing"), and a company organizational unit (e.g. "Ariba®"). Other examples for the domain can be, but not limited to "payroll" domain, "customer relationship management" domain, "human resource" domain, "sales" domain, "medical" domain, "auto-parts" domain, "education" domain, and "travel" domain.

Further, "translator quality history" check may check track record of translation quality of translators. If the translator has produced low-quality translations in the past, the text may be labeled with a lower confidence value. Also, the confidence value may be improved when the translator has produced better quality translations. In "language change over time" check, outdated language in the translation is periodically checked to avoid translations using outdated wordings. For example, texts like "save to disk" could be translated as "Auf Diskette speichern" in German (i.e., "save to floppy disk") in the 80s/90s. Nowadays, floppy disks are not used anymore, so that the translation can be considered as outdated. In "clean-up of outdated terminology" check, the usage frequency of terminology is checked to clean-up outdated (e.g., sleeping or dying) terminology from the terminology databases.

At 230, when the received translated text is determined as correct translation, a check is made to determine whether any text in the content is remaining for translation. When there is no text to be translated, submission of the translated content is permitted, at 240. When there is text remaining to be translated, a next translated text is received, at 250. Further, the check is made to determine whether the received translated text is correct translation or incorrect translation as in 220.

At 260, when the received translated text is determined to be incorrect translation, an error category corresponding to the incorrect translation is determined based on a root cause of the incorrect translation. For example, different incorrect translations are grouped or clustered into different error categories based on the root cause of the incorrect translation. The root cause of the error defines reason for the incorrect translation. The error categories are defined according to the actions that need to be carried out when the incorrect translation or an error or an issue occurs. For example, for categorizing the error categories, an error category hierarchy defining a de-facto standard may be used. Example root causes and corresponding error categories are described in FIG. 3.

At 270, upon determining the error category, a counter is incremented in the corresponding error category. For example, each error category may include corresponding counters. When an error associated with the error category occurs, the counter in the error category is incremented. At 280, a check is made to determine whether the counter exceeds a threshold associated with the error category. For example, the threshold value defines a maximum number of acceptable errors. Different error categories may include different thresholds. The threshold may be relative to size of the content (e.g., number of words or pages in a document or number of texts on a user interface). Additionally, the threshold can be set as number of errors or as a percentage of number of words translated, so a higher word count may be treated consistently with a lower word count. Further, thresholds can be set higher in sensitive fields such as law, science and the like.

When the counter associated with the error category exceeds its threshold, the error category may be considered for a combined error score. The combined error score is a combined weighted error score from all error categories which have exceeded their respective thresholds. The thresholds associated with the error categories may be configured. For example, the thresholds can be displayed to a user in an editable graphical user interface which can be edited by the user and saved for one or more error categories. Further, depending on the different use cases or domains, the error category may be considered more important than others. For example, with summarizations, "accuracy" error category may be discarded, instead, e.g. "fluency" error category becomes important.

At 290, an action is triggered to prevent submission of the translation based on a combined error score, when the counter exceeds the threshold associated with the error category. For example, when the counter in the error category exceeds the threshold, the combined error score is determined. Further, a check is made to determine whether the combined error score exceeds a predefined value or a language quality tolerance. When the combined error score exceeds the predefined value, the action is triggered, else the translation process is continued. The predefined value may be configured. For example, the predefine value can be displayed to the user in the editable graphical user interface which can be edited by the user and saved. The action may include, but not limited to preventing submission of translation of the content, notifying to correct errors in the translation (e.g., terminology related errors) or notifying low quality source of the content. Hence, the translation quality control system detects low-quality translations to reduce costs for retranslation and improve user experience. Also, the translation quality control system provides an efficient, economical, reliable, and timely method for a computer system to automatedly assess the quality and accuracy of the translation. Hence, early awareness of translation errors has the potential to reduce the level of inefficient translation resources accumulating in a project. For example, a decision can be made after a few sentences to switch to more effective translation resource.

Figure 3:
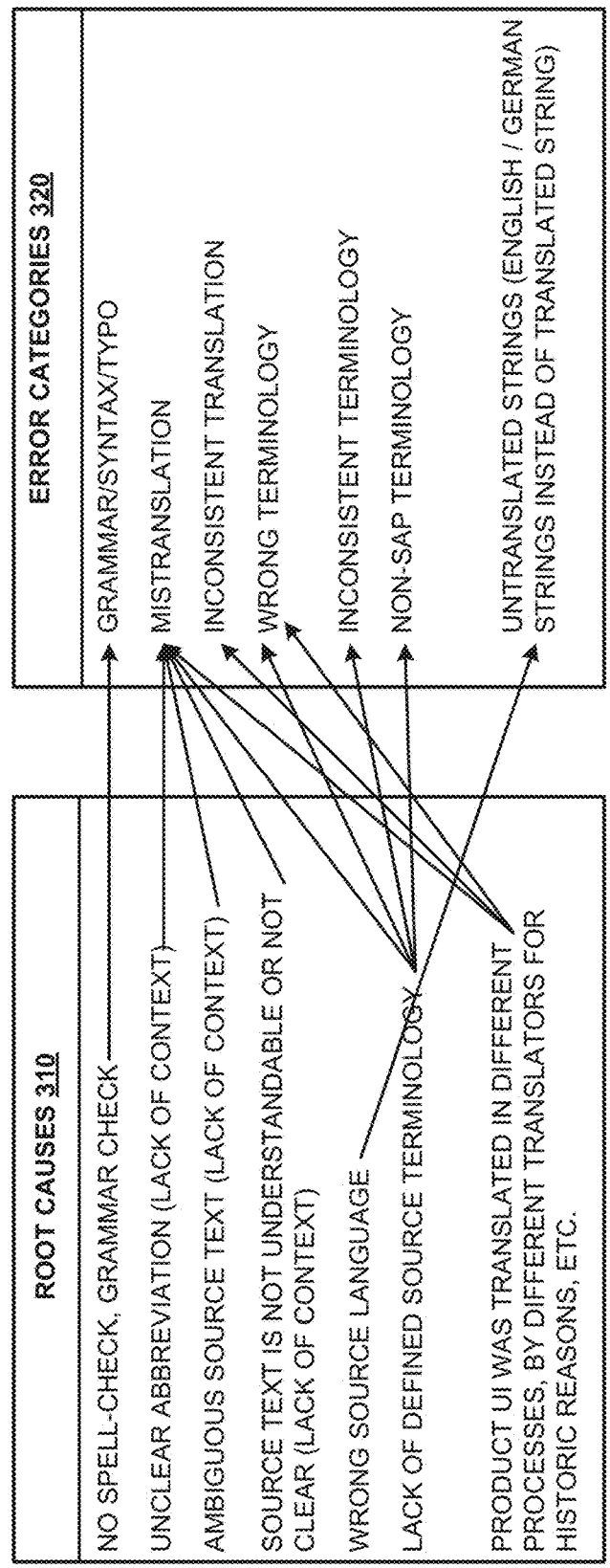
FIG. 3 is a table illustrating example root causes mapped with corresponding error categories, according to an embodiment.

FIG. 3 is a table illustrating example root causes mapped with corresponding error categories, according to an embodiment. Incorrect translations are grouped or clustered into different error categories (e.g., 320) to categorize quality issues and/or translation errors. The incorrect translations are grouped based on the root causes associated with the incorrect translations. The root causes define reasons for the incorrect translations. FIG. 3 depicts example root causes (e.g., 310). Example root causes may include, but are not limited to "no spell-check, grammar check", "unclear abbreviation", "ambiguous source text", "source text is not understandable or not clear", "wrong source language", "lack of defined source terminology", "space is restricted to English word length (or insufficient additional space available)", "strings were not exposed for translation (or not provided to translation)", "lack of instructions on translatability or translation-relevance", "lack industry knowledge of translators", and "product user interface was translated in different processes, by different translators for historic reasons"

Further, the different root causes are mapped to different error categories 320. For example, the incorrect translations due to the root causes "unclear abbreviation", "ambiguous source text", "source text is not understandable or not clear"

are mapped to an error category "mistranslation" as shown in FIG. 3. Similarly, different root causes may be grouped into different error categories. In one embodiment, each error category may be assigned different weighting based on frequency and priority of the errors. For example, the weightage associated with the error category "grammar/syntax/typo" may be assigned higher value as wrong spelling or grammar affects user experience. Also, incorrect translation of a text on a user interface may be given greater weightage than a text in the background. Further, applications, which are used often may be given greater weightage than those used less often.

In one embodiment, based on the thresholds, combined error score and a predefined value, an action to prevent submission of translation is triggered as described at steps 270, 280 and 290 of FIG. 2. The thresholds associated with the error categories and a predefined value or a language quality tolerance are configurable to match the use-cases or domains. For example, when a text is machine translated, the thresholds and the language quality tolerance may be configured in a lenient way. For translations into languages such as Russian, Turkish, middle-east and the like, the internationalization error category becomes important, as country-specific terms may be translated according to the daily-changing political climate. In the middle-east, for example, the mention of alcohol is a difficult topic and will be perceived as offensive.

Figure 4:
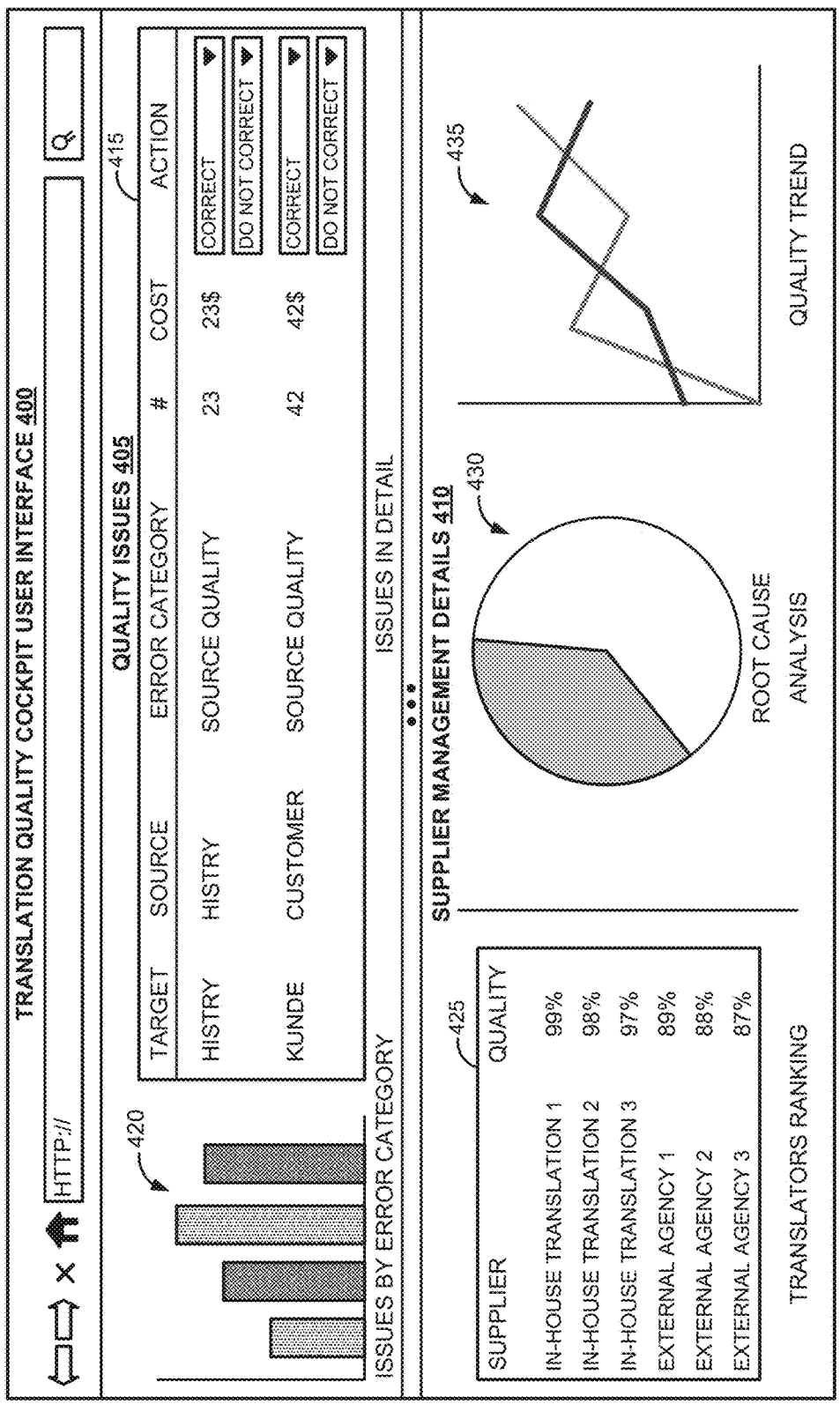
FIG. 4 illustrates an example translation quality cockpit user interface, according to an embodiment.

FIG. 4 illustrates example translation quality cockpit user interface 400, according to an embodiment. The translation quality cockpit user interface 400 is generated to visualize quality issues 405 and supplier management details 410 associated with translation of content. The translation quality cockpit user interface 400 may include two portions to depict the quality issues 405 and the supplier management details 410, respectively. For example, the quality issues 405 may be displayed in a table (e.g., 415) to depicts issues in detail. The table 415 includes texts in target language, texts in source language, error category, number of times the error has occurred, cost for fixing the error, and action to be take (e.g., to correct or not to correct). For example, an error where "Histry" is written instead of "History" is considered under an error category "mistranslation" associated with source quality. Further, the error has occurred 23 times and the cost for correcting the error is 23$. Hence, through the translation quality cockpit user interface 400, the quality manager may visualize the quality issues 405 in detail according to different error categories.

In one embodiment, when an error could not be avoided during translation and for which correction is required, an automatic cost estimation may be calculated to support the quality manager in his or her decision (e.g., whether it is worth to trigger a retranslation or correction). For example, if a key term like "Log on"/"Log off" should be replaced in Polish language with a newer translation variant, a number of texts may be counted, which may have to be updated. Further, terminology domain may be considered during cost estimation, and the resulting count forms the basis for the overall cost estimation.

In one embodiment, the quality issues 405 are depicted graphically. For example, issues by error category is depicted in a bar graph (e.g., 420). Further, the supplier management details 410 provide details regarding translators or suppliers graphically. For example, ranking of the translators based on delivered quality is provided (e.g., 425). The ranking may be used to adapt the pricing or reward good quality as well as to automatically check the quality of translations coming from certain suppliers. Further, root cause associated with the quality of the translators is analyzed to know the reason behind low-quality translation (e.g., 430). Based on the analysis, necessary actions may be taken (e.g., providing required training for the translators, updating missing knowledge of tools used for translation and the like). Also, quality trends of the suppliers may be provided (e.g., 435).

In one embodiment, user interface or display of translated content may include a feedback option (e.g., a low-quality translation feedback button). Hence, developers, testers and customers may provide feedback on low-quality translations as early as possible using the low-quality translation feedback button. Such feedback may be routed to the team responsible for the translation and it can be tracked in the translation quality cockpit user interface 400. Further, the translation quality cockpit user interface 400 may provide statistics of the usage of the collaboration component and helps to track down the reasons and sources of the low-quality translation.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
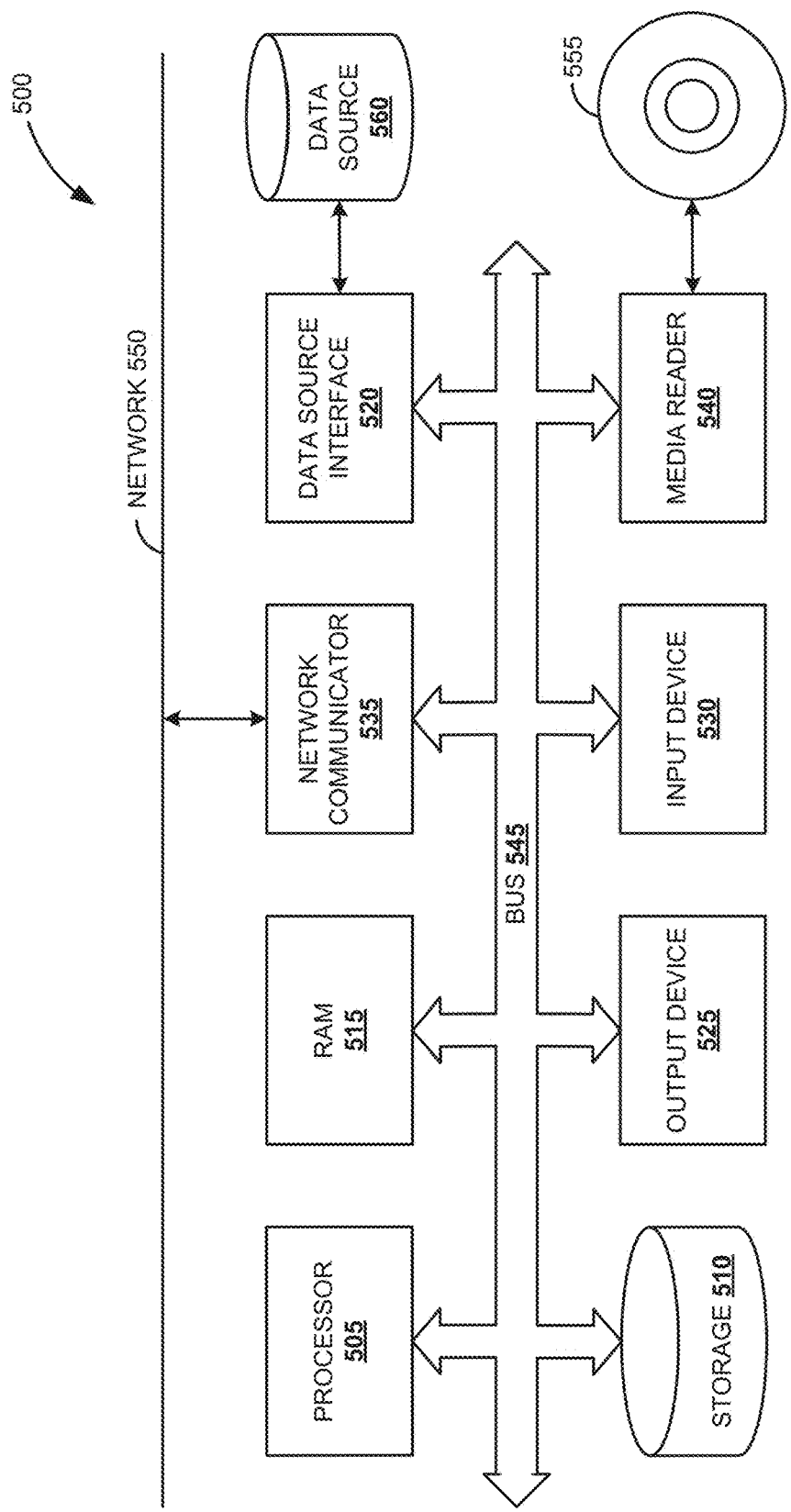
FIG. 5 is a block diagram illustrating an example computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
   receive a translated text during translation of content from a source language to a target language, wherein the translated text is associated with part of the content to be translated;
   detect the received translated text as an incorrect translation by analyzing a number of quality checks in a translation quality algorithm;
   determine an error category corresponding to the incorrect translation based on a root cause defining a reason for the incorrect translation;
   increment a counter corresponding to the error category; and
   when the counter corresponding to the error category exceeds a threshold associated with the error category, trigger an action by the computer to prevent submission of the translation based on a combined error score, wherein the threshold associated with the error category is displayed to a user and editable by the user via a graphical user interface (GUI), and the combined error score is a combined weighted error score from error categories which have exceeded their respective thresholds, wherein the action comprises providing a notification to correct errors in the translation and a notification of a low quality source of the content.

2. The non-transitory computer-readable medium of claim 1, wherein the content comprises at least one of digital content or a software, and the content includes text, images, audio, video or any combinations thereof.

3. The non-transitory computer-readable medium of claim 1, wherein when the counter does not exceed the predefined value associated with the error category:
  determine whether a text in the content is remaining for translation;
  when there is a text to be translated, receive a next translated text; and
  when there is no text to be translated, permit to submit the translation of the content.

4. The non-transitory computer-readable medium of claim 1, wherein the action to prevent submission of the translation is triggered when the combined error score exceeds a predefined value.

5. The non-transitory computer-readable medium of claim 1, further comprising instructions, which when executed by the computer cause the computer to:
  generate a translation quality cockpit user interface to visualize quality issues and supplier management details associated with the translation of the content.

6. The non-transitory computer-readable medium of claim 5, wherein the quality issues comprise corresponding error category of the incorrect translation and cost for fixing an error, and the supplier management details comprise ranking of translators, root cause associated with quality of the translators and quality trends of the translators.

7. A computer implemented method to assess translation quality, comprising:
  receiving, at a translation quality control system, a translated text during translation of content from a source language to a target language, wherein the translated text is associated with part of the content to be translated;
  detecting, by an online language test unit of the translation quality control system, the received translated text as an incorrect translation by analyzing a number of quality checks in a translation quality algorithm by accessing a translation quality algorithm unit and a master data repository;
  determining an error category corresponding to the incorrect translation based on a root cause defining a reason for the incorrect translation;
  incrementing a counter corresponding error category; and
  when the counter exceeds a threshold associated with the error category, triggering, by the online language test unit, an action to prevent submission of the translation based on a combined error score, wherein the threshold associated with the error category is displayed to a user and editable by the user via a graphical user interface (GUI) of the translation quality control system, and the combined error score is a combined weighted error score from error categories which have exceeded their respective thresholds, wherein the action comprises providing a notification to correct errors in the translation and a notification of a low quality source of the content.

8. The computer implemented method of claim 7, wherein the content comprises at least one of digital content or a software, and the content includes text, images, audio, video or any combinations thereof.

9. The computer implemented method of claim 7, wherein when the counter does not exceed the predefined value associated with the error category:
  determining whether a text in the content is remaining for translation;
  when there is a text to be translated, receiving a next translated text; and
  when there is no text to be translated, permitting to submit the translation of the content.

10. The computer implemented method of claim 7, wherein the action to prevent submission of the translation is triggered when the combined error score exceeds a predefined value.

11. The computer implemented method of claim 7, further comprising:
  generating a translation quality cockpit user interface to visualize quality issues and supplier management details associated with the translation of the content.

12. The computer implemented method of claim 11, wherein the quality issues comprise corresponding error category of the incorrect translation and cost for fixing an error, and the supplier management details comprise ranking of translators, root cause associated with quality of the translators and quality trends of the translators.

13. A computing system to assess translation quality, comprising:
  at least one processor; and
  one or more memory devices communicative with the at least one processor, wherein the one or more memory devices store instructions to:
    receive a translated text during translation of content from a source language to a target language, wherein the translated text is associated with part of the content to be translated;
    detecting the received translated text as an incorrect translation by analyzing a number of quality checks in a translation quality algorithm;
    determine an error category corresponding to the incorrect translation based on a root cause defining a reason for the incorrect translation;
    increment a counter in a corresponding error category; and
    when the counter exceeds a threshold associated with the error category, trigger, an action by the at least one processor to prevent submission of the translation based on a combined error score, wherein the threshold associated with the error category is displayed to a user and editable by the user via a graphical user interface (GUI), and the combined error score is a combined weighted error score from error categories which have exceeded their respective thresholds, wherein the action comprises providing a notification to correct errors in the translation and a notification of a low quality source of the content.

14. The computing system of claim 13, wherein the content comprises at least one of digital content or a software, and the content includes text, images, audio, video or any combinations thereof.

15. The computing system of claim 13, wherein when the counter does not exceed the predefined value associated with the error category:
  determine whether a text in the content is remaining for translation;
  when there is a text to be translated, receive a next translated text; and
  when there is no text to be translated, permit to submit the translation of the content.

16. The computing system of claim 13, wherein the action to prevent submission of the translation is triggered when the combined error score exceeds a predefined value.

17. The computing system of claim 13, further comprising:
    generate a translation quality cockpit user interface to visualize quality issues and supplier management details associated with the translation of the content.

* * * * *